UNITED STATES PATENT OFFICE.

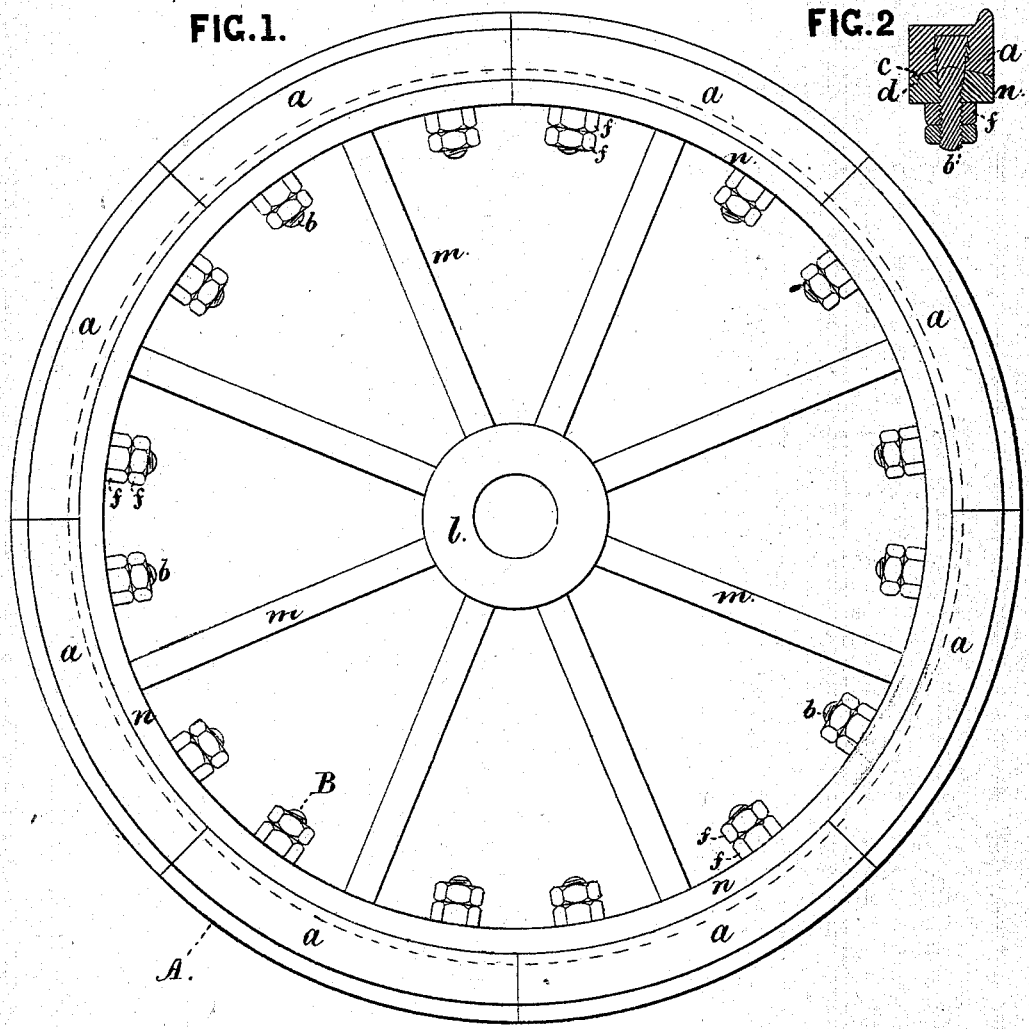
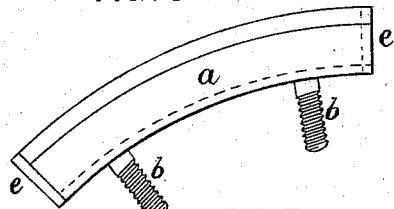
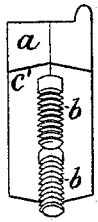
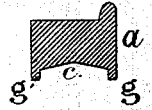
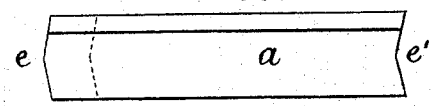
G. J. CROSS.
Wheels for Vehicles.
No. 139,661.  Patented June 10, 1873.

GEORGE J. CROSS, OF GREENWICH, ENGLAND.

IMPROVEMENT IN WHEELS FOR VEHICLES.

Specification forming part of Letters Patent No. 139,661, dated June 10, 1873; application filed April 8, 1873.

*To all whom it may concern:*

Be it known that I, GEORGE JAMES CROSS, of Greenwich, in the county of Kent, England, engineer, have invented certain Improvements in Wheels for Tram-ways, Railways, Contractors, and other Carriages, Wagons, or other Vehicles, of which the following is a specification:

According to my invention I form the tires of wheels in segments, and I attach them to the circumference or felly of the wheels by screws or bolts, secured to the inside circumference or felly by nuts or otherwise.

Figure 1 of the accompanying drawings is a view, in side elevation, of a wheel constructed according to my invention. Fig. 2 is a section through the line A B of Fig. 1. Fig. 3 is a side elevation. Fig. 4 is an end elevation, and Fig. 5 is a plan, of one of the segments detached; and Fig. 6 is a section of a segment, showing it made with flanges to fit over the fellies.

$a\ a$ are the segments, all arranged round and secured to the felly $n$ of the wheel. $b\ b$ are screw-threaded bolts inserted in the segments. These bolts are preferably inserted in the mold in which the segments are cast, and the metal of which the segments are formed is run into the molds and around the bolts, so that the said bolts become embedded in the segments and form, as it were, a portion thereof, with the other or screw-threaded ends of the bolts projecting, as shown at Figs. 3 and 4. $c$ shows the V-shaped portion of the under side of the segments, and $d$ shows the corresponding V-shaped part on the felly of the wheel, the one portion on the segment $c$ fitting onto the other portion $d$ on the felly, as shown at Fig. 2. $e$ is a projection on one end, and $e'$ is a recess on the opposite end, of each segment, which enter into corresponding recesses and projections in the adjoining segment. Sometimes, for greater security, I form a small flange or lug on the sides of the segments, as shown at $g$, Fig. 6, to fit over and to rest against the sides of the circumference of the felly of the wheel. $f\ f$ are nuts for securing the segments to the felly after the bolts have been passed through the said felly. I place packing between the felly and the segments.

To put the wheel together one segment after the other is laid on the felly with the bolts passing through the same, and the nuts are screwed up tightly against the inside of the felly, or, instead of nuts, cotters or other means of securing the bolts may be used.

By my invention I am able to make the body of the wheel—viz., the boss $l$—of cast-iron, spokes $m$ of three-fourths tubing, of pipes or of X-section iron, and the circumference of cast-iron, steel, or wrought iron, while the segments forming the tire are made of steel, or of a superior metal, and preferably of a metal, as hereafter described. In this manner I am enabled to make the segments alone with that chill or hardness which is such an essential feature in tram-way wheels, and has heretofore been so difficult to obtain when the whole wheel has to be made of one metal and in one casting, whereas by my invention the necessary chill or hardness is easily obtained in the segments, and there is less liability to crack, because there is no contraction to contend against.

By my invention the segments of the tire can be attached to the felly of the wheel and detached with facility when required, so that when a segment or segments of the tire is or are worn, it or they can be easily removed and replaced by new segments, and thus an old or worn wheel is with facility repaired.

The segments may be made of any suitable metal; but I prefer to make them and tram-way wheel tires generally of a combination of cold-blast pig-metal iron and soft pig or soft scrap cast-iron, or other soft pig-iron smelted together and run into an ordinary chill-box; or I use a metal composed of hard white pig-metal iron known as Thornaby and Linthorpe white pig metal from Middlesbro, or other hard white pig metal possessing similar qualities, in combination with soft pig, known as Calder No. 1, soft pig-iron or soft scrap cast-iron, or other soft pig iron possessing similar qualities to Calder No. 1. These are smelted together, well mixed, and then run into an ordinary chill-box; or I use a metal composed of cast-iron and steel mixed, known as "Prussian metal;" or I make the segments of steel rolled to section, then cut into proper lengths and subsequently circled by hydraulic pressure; countersunk headed bolts are passed right through the segments and secured in the manner before described; or the steel segments may be cast in molds; but, as I have before stated, I do not limit myself to any particular class of metal for making the segments, as aforesaid, although I give the preference to one or other of the metals before named.

I claim as my invention—

The segments $a$ of metal, bolted to the felly or rim $n$ of the metallic wheel $l\ m\ n$, as and for the purposes specified.

GEORGE JAMES CROSS.

Witnesses:
SOFUS E. HOLTEN,
    82 *Gracechurch St., London, E. C.*
J. W. WYNN,
    24 *Royal Exchange.*